United States Patent
Osumi et al.

(10) Patent No.: US 10,841,987 B2
(45) Date of Patent: Nov. 17, 2020

(54) DISPLAY DEVICE

(71) Applicant: OMRON Corporation, Kyoto (JP)

(72) Inventors: Yoshimasa Osumi, Kyoto (JP); Yuji Hirose, Kyoto (JP); Keiichiro Tanaka, Shiga (JP); Toshinori Yamasue, Shiga (JP)

(73) Assignee: Omron Corporation, Kyoto (JP)

( * ) Notice: Subject to any disclaimer, the term of this patent is extended or adjusted under 35 U.S.C. 154(b) by 332 days.

(21) Appl. No.: 15/876,056

(22) Filed: Jan. 19, 2018

(65) Prior Publication Data

US 2018/0146519 A1    May 24, 2018

Related U.S. Application Data

(63) Continuation of application No. PCT/JP2016/073686, filed on Aug. 11, 2016.

(30) Foreign Application Priority Data

Sep. 1, 2015   (JP) ................. 2015-172243

(51) Int. Cl.
    *H05B 33/02*       (2006.01)
    *G03B 21/10*       (2006.01)
    (Continued)

(52) U.S. Cl.
    CPC ............ *H05B 33/02* (2013.01); *B60K 35/00* (2013.01); *B60K 37/02* (2013.01); *G02B 6/0001* (2013.01);
    (Continued)

(58) Field of Classification Search
    CPC .............. G02B 27/0101; G02B 27/01; G02B 2027/0141; G02B 6/0036; G02B 6/006;
    (Continued)

(56) References Cited

U.S. PATENT DOCUMENTS

5,668,907 A * 9/1997 Veligdan .............. G02B 6/02
                                                                                                  385/115
5,949,346 A    9/1999   Suzuki et al.
                (Continued)

FOREIGN PATENT DOCUMENTS

CN       1918428 A     2/2007
CN     101681034 A     3/2010
           (Continued)

OTHER PUBLICATIONS

Office Action issued in Chinese Application No. 201680041488.X; dated Sep. 9, 2019 (14 pages).

(Continued)

*Primary Examiner* — Koosha Sharifi-Tafreshi
(74) *Attorney, Agent, or Firm* — Osha Bergman Watanabe & Burton LLP (57) ABSTRACT

A display device is configured to show an image inside a vehicle, and mounted inside the vehicle as an internal component. The display device has a light source configured to emit light, and a light guide element configured to guide incident light from the light source. The light guide element includes an emission surface configured to output incident light, and a plurality of light focusing portions configured to change the path of the incident light toward the emission surface, causing the light output to converge toward a convergence point or convergence line outside the light guide element or to radiate from a convergence point or convergence line outside the light guide element and thereby form an image outside the light guide element.

10 Claims, 9 Drawing Sheets

(51) Int. Cl.
  *B60K 37/02* (2006.01)
  *G03B 29/00* (2006.01)
  *G03B 21/62* (2014.01)
  *B60K 35/00* (2006.01)
  *G02B 30/26* (2020.01)
  *F21V 8/00* (2006.01)
  *G03B 21/20* (2006.01)
  *G02B 6/34* (2006.01)
  *G02B 30/36* (2020.01)

(52) U.S. Cl.
  CPC ............. *G02B 30/26* (2020.01); *G03B 21/10* (2013.01); *G03B 21/2006* (2013.01); *G03B 21/62* (2013.01); *G03B 29/00* (2013.01); *B60K 2370/152* (2019.05); *B60K 2370/1529* (2019.05); *B60K 2370/178* (2019.05); *B60K 2370/334* (2019.05); *G02B 6/0036* (2013.01); *G02B 6/34* (2013.01); *G02B 30/36* (2020.01)

(58) Field of Classification Search
  CPC .. G02B 27/22; G02B 27/225; G02B 27/2292; G02B 6/002; B60K 35/00; B60K 2370/1529
  See application file for complete search history.

(56) References Cited

U.S. PATENT DOCUMENTS

| | | | | |
|---|---|---|---|---|
| 6,100,943 | A * | 8/2000 | Koide | .................... B60K 37/02 349/11 |
| 6,144,480 | A | 11/2000 | Li et al. | |
| 8,289,229 | B2 | 10/2012 | Ishikawa et al. | |
| 2006/0181399 | A1 | 8/2006 | Sumiya | |
| 2006/0202979 | A1 * | 9/2006 | Manabe | ................. G09G 5/006 345/204 |
| 2007/0104415 | A1 * | 5/2007 | Sugiura | .................. G02B 30/00 385/14 |
| 2007/0279391 | A1 | 12/2007 | Marttila et al. | |
| 2008/0024463 | A1 * | 1/2008 | Pryor | ..................... B60K 35/00 345/175 |
| 2010/0177025 | A1 | 7/2010 | Nagata et al. | |
| 2013/0208363 | A1 | 8/2013 | Masuda | |
| 2013/0258693 | A1 * | 10/2013 | Hatakeyama | .......... B60K 35/00 362/509 |
| 2014/0267205 | A1 | 9/2014 | Nestorovic | |
| 2014/0268327 | A1 | 9/2014 | Dunn et al. | |
| 2015/0091874 | A1 * | 4/2015 | Drescher | ................ G06F 3/042 345/175 |
| 2015/0219913 | A1 * | 8/2015 | Lee | ...................... G01D 13/265 359/462 |

FOREIGN PATENT DOCUMENTS

| | | | | |
|---|---|---|---|---|
| CN | 101876753 | A | 11/2010 | |
| CN | 103241177 | A | 8/2013 | |
| DE | 4211728 | A1 * | 10/1993 | ............ B60K 35/00 |
| JP | H09-152360 | A | 6/1997 | |
| JP | 2000510603 | A | 8/2000 | |
| JP | 2006-214757 | A | 8/2006 | |
| JP | 2008275922 | A | 11/2008 | |
| JP | 2009540440 | A | 11/2009 | |

OTHER PUBLICATIONS

International Search Report issued in PCT/JP2016/073686, dated Oct. 18, 2016 (2 pages).
Written Opinion issued in PCT/JP2016/073686, dated Oct. 18, 2016 (4 pages).

* cited by examiner

DISPLAY DEVICE

BACKGROUND

Field

The present invention relates to a display device for displaying an image that serves as an internal component of a conveyance such as an automobile.

Related Art

A variety of warning lights may be included in a panel (instrument panel) arranged inside a vehicle such as a passenger car to provide notifications on the vehicle state. The content of the warnings provided by an arrangement of warning lights tend to be shown in small hard-to-see areas regardless of the importance of the information to be presented.

For instance, Japanese Patent Publication No. 2006-214757 discloses a vehicle display device provided with a warning display unit and multifunction display unit; the warning display unit lists all the plurality of warning indicators that may be presented thereon individually, while the multifunction display unit can present details for a plurality of warnings. The vehicle display device shows the relevant warning indicator on the warning display unit when showing the details of the warning on the multifunction display unit.

SUMMARY

However, given the large variety of content, such as warning lights which may be presented on the instrument panel, the panel design and the individual warning lights may be given a size and a position that are hard to see. Selecting a size and a position that improves the visibility of the warning lights, and the like may then lead to limiting the design of the panel. However, limits to designing the panel remain despite providing the vehicle display device described in Japanese Patent Publication No. 2006-214757 with a multifunction display unit capable of presenting details and providing a warning display unit that lists all the plurality of warning indicators that may be presented thereon individually.

One or more embodiments of the present invention provides a display device as an internal component, the display device equipped with a light guide element capable of changing an optical path to form an image externally which improves flexibility in designing other components in an instrument panel and the like and improves visibility.

A display device according to one or more embodiments of the present invention is configured to show an image inside a vehicle, and is mounted inside the vehicle as an internal component. The display device includes a light source configured to emit light; and a light guide element configured to guide incident light from the light source; the light guide element including: an emission surface configured to output incident light; and a plurality of light focusing portions configured to change the path of the incident light toward the emission surface, causing the light output to converge toward a convergence point or convergence line outside the light guide element or to radiate from a convergence point or convergence line outside the light guide element and thereby form an image outside the light guide element.

In the display device described herein the light focusing portions are configured to form an image on a virtual plane oblique or orthogonal to the emission surface.

In the display device described herein the light guide element is arranged at the upper part of a dashboard with the emission surface oriented upward; and the light focusing portions form an image above the dashboard.

In the display device described herein the light guide element is configured for arrangement on a window surface of the vehicle with the emission surface oriented toward inside the vehicle.

In the display device described herein the light guide element is configured for arrangement on an internal component of the vehicle including at least one of a glove box, a center console, an arm rest, a door trim, a container trim, and a front seat.

In the display device described herein the light focusing portions are configured to form an image at a position visible from a driver seat.

In the display device described herein the light focusing portions are configured to form an image at a position visible from a driver seat behind the driver seat.

In the display device described herein the light focusing portions are configured to form an image for presentation of an image representing at least one of the vehicle state, a vehicle ridership state, and a vehicle operation state.

A display device described herein may be mounted in a conveyance and configured to show an image inside the conveyance; and includes: a light source configured to emit light; and a light guide element configured to guide incident light from the light source; the light guide element including: an emission surface configured to output incident light; and a plurality of light focusing portions configured to change the path of the incident light toward the emission surface, causing the light output to converge toward a convergence point or convergence line outside the light guide element or to radiate from a convergence point or convergence line outside the light guide element and thereby form an image outside the light guide element.

The display device described herein is capable of presenting an image formed inside a conveyance such as a passenger vehicle.

Effects

Embodiments of the present invention are provided as internal components and include a light source and a light guide element, and the light guide element uses incident light entering therein from the light source to form an image externally. Hereby, the display device can thereby show display content such as various warning lights and the like outside the device, and for instance, in a space above a dashboard. Accordingly, the display device exhibits superior benefits such as, allowing other internal components to be designed without, for instance, being adversely limited by the instrument panel design and reducing constraints on the design of other components while providing better visibility.

DETAILED DESCRIPTION

Embodiments of the present invention are described in detail with reference to the drawings. Note that the following working example is merely an embodiment of the present invention and in no way limits the technical character of the present invention.

Figure 1:
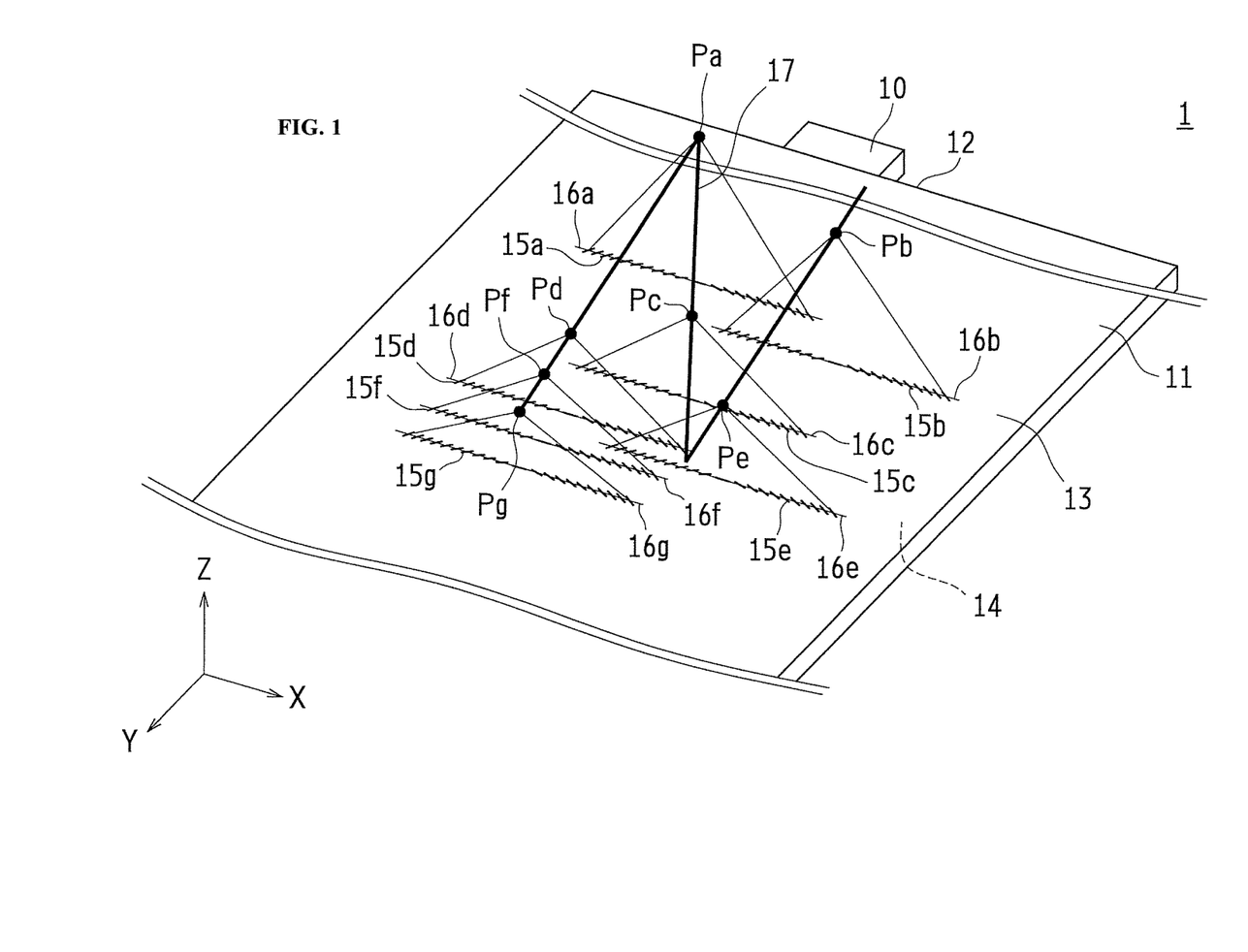
FIG. 1 is for describing a display device according to embodiments of the present invention and schematically illustrates the display device along with an image formed in a space.

The display device according to embodiments of the present invention focuses light in a space inside a conveyance, e.g., vehicle such as a passenger car, and produces an image therein. First, the principle of producing an image in a space is described. FIG. 1 is for describing a display device according to embodiments of the present invention and schematically illustrates the display device along with an image formed in a space. Note that the drawings are provided as outlines or schematic views to facilitate a simple and easy-to-understand description. There are also cases where the drawings referenced in the description contain elements that are not drawn to scale in terms of the horizontal and vertical proportions or the spaces between components.

The light emitting device 1 is provided with a light source 10 that emits light and a light guide plate 11 (light guide element) that guides the incident light from the light source 10. The light source 10 may be configured using a light emitting element such as an LED with the light emitted from the light source 10 entering the light guide plate 11. The light guide plate 11 may be formed from a flexible thin-film material or curable sheet into a rectangular panel-like shape using a transparent resin having a high refractive index such as a polycarbonate (PC) resin or poly methyl methacrylate (PMMA) resin, or using an inorganic material such as glass. Here "panel like" indicates an object that is shorter (thinner) in the thickness direction (Z axis direction) than in the planar direction spreading out in two dimensions (XY plane) orthogonal to the thickness direction. That is, while the light guide plate 11 is a rectangular parallelepiped, the length thereof in the thickness direction (Z axis direction) is less than the length in a plane spreading out in two dimensions and formed by the longitudinal direction (X axis direction) and the transverse direction (Y axis direction).

The light source 10 is installed at one end surface in the longitudinal direction of the light guide plate 11. That is, one of the surfaces making up the short side of the rectangle in the thickness direction is the incidence end surface 12 where light emitted from the light source 10 enters. The light guide plate 11 causes light entering therein from the incidence end surface to spread out in planar form. The panel-like light guide plate 11 includes an emission surface 13 configured to emit incident light entering from the light source 10 and a rear surface 14 relative to and across from the emission surface 13.

In the description that follows, the rectangular coordinate system, and in particular the right-handed system of x axis, y axis, and z axis is used as necessary. The X axis is the transverse direction of the light guide plate 11, i.e., the direction along the short side of the rectangle. The Y axis is the longitudinal direction of the light guide plate 11, i.e., the direction along the long side of the rectangle, where the direction from the incidence end surface 12 toward the end surface facing the incidence end is the positive direction. The Z axis is the thickness direction of the light guide plate 11, where the direction from the rear surface 14 to the emission surface 13 is the positive direction. The light guide plate 11 may be used in a non-planar way, e.g., may be bent for use. In this case, the surface including the main portion of the emission surface 13 or a neighboring surface may be used as a reference for the X axis, Y axis, and Z axis.

A plurality of light focusing portions 15 is formed on the rear surface 14 of the light guide plate 11; the light focusing portions 15 are represented as light focusing portions 15a, 15b, 15c, . . . in the drawings. The light focusing portions 15 are situated along the progressive path of incident light entering from the incidence end surface; that is, the light focusing portions 15 adjust the optical path of the incident light toward the emission surface 13. Here, the light focusing portions 15 are illustrated as optical surfaces formed inside the light guide plate 11, and in this particular case, as reflection surfaces 150 (FIG. 2: 150x, 150y; and FIG. 3: 150x1, 150x2, 150x3) that reflect incident light entering from the incidence end surface 12. Oblique notches may be cut into the rear surface 14 with the inclined surfaces serving as the reflection surfaces 150. The reflection surfaces 150 of the light focusing portions 15 are formed as substantially continuous in the X axis direction. More specifically, the plurality of light focusing portions 15a, 15a, . . . fall along a line 16a, and the plurality of light focusing portions 15b, 15b, . . . fall along a line 16b. The plurality of light focusing portions 15c, 15d, . . . , 15g fall along lines 16c, 16d, . . . , line 16g respectively in the same manner. Here the lines 16 (lines 16a, 16b, . . . , 16g) are virtual straight lines extending substantially parallel to the X axis on the rear surface 14. Any given light focusing portion 15, 15, . . . is formed as substantially continuous along a straight line 16 that is substantially parallel to the X axis direction. The incident light entering the light guide plate 11 is guided toward the light focusing portions 15, 15, . . . lined up along the X axis direction.

The light focusing portions 15 include components such as the reflection surfaces 150 for changing the optical path. The reflection surface 150 in a light focusing portion 15 changes the path of incident light causing the light to exit from the emission surface 13 and substantially converge at convergence point P corresponding to the light focusing portion 15. FIG. 1 depicts a portion of the light focusing portions 15, namely, light focusing portions 15a, 15b, . . . , 15g; more specifically, FIG. 1 depicts the plurality of light rays with paths changed by each of the light focusing portions 15a, 15b, . . . , 15g converging at convergence points Pa, Pb, . . . , Pg respectively. Each of the light focusing portions 15 cause the light rays to converge at convergence points P to form an image, thus forming an image 17.

More specifically, the plurality of light focusing portions 15 on any of the lines 16a, 16b, . . . may correspond to a convergence point P in the image 17. The plurality of light focusing portions 15 in any given line 16 may change the optical path of the light rays emanating from the positions of the light focusing portions 15 when light reflects from the optical surfaces, e.g., from the reflection surfaces 150; hereby the light rays exit from the emission surface 13 and converge at a convergence point P. Therefore, the wavefront of light from the plurality of light focusing portions 15 becomes a wavefront that appears to radiate from the convergence point P. For example, the plurality of light focusing portions 15a on the line 16a corresponds to a convergence point Pa in the image 17. The light focusing portions 15a change the optical path of the light rays guided toward the plurality of light focusing portions 15a on the line 16a, and thus the light rays exit from the emission surface 13 and converge at the convergence point Pa. Light reflected by the plurality of light focusing portions 15 along other lines 16 converges identically at convergence points P. Thus, any desired light focusing portion 15 can provide a wavefront of light so that light appears to radiate from the corresponding convergence point P. The convergence points P correspond to mutually different light focusing portions 15. A grouping of a plurality of convergence points P that correspond to each of the light focusing portions 15 produces a recognizable image 17 in a space. The display device 1 thus projects the image 17 as a three-dimensional image in a space. The image 17 depicted in FIG. 1 is drawn as a three-dimensional image with lines; the lines used to draw the image 17 are produced by grouping a plurality of convergence points P corresponding to each of the light focusing portions 15.

The display device 1 forms an image with light exiting from the emission surface 13 to produce the image 17 as a spectroscopic image. The image 17 is a spectroscopic image that may be recognized in a space by an observer. Note that in this specification, the term spectroscopic image refers to an image 17 that appears to be at a location that is different from the emission surface 13 external to the display device 1. The term spectroscopic image is not limited to a three-dimensional image and includes a two-dimensional image perceived at a location separate from the efficient surface 13 of the display device 1, for instance. In other words the term "spectroscopic image" does not refer only to an image perceived as having a solid shape, but also includes the image 17 in two-dimensional form perceived at a different location than on emission surface 13 of the display device 1 and represents an image 17 that appears to be protruding from the light guide plate 11 of the display device 1.

The light guided by the light guide plate 11 is oriented in a direction connecting locations in the light guide plate 11 and the light source 10 while not including a spread component orthogonal to a direction connecting locations in the light guide plate 11 and the light source 10. The light focusing portions 15 may be provided at locations separated from the light source 10; in this case, the light guided by the light guide plate 11 is oriented generally towards the Y axis direction from the location at which the light focusing portion is provided but does not spread in the X axis direction. Therefore, light from the light focusing portion 15 substantially converges onto a single convergence point P in a plane parallel to the XZ plane that includes the convergence point P.

When light entering the light focusing portions 15 spread in the Z axis direction, the light from the light focusing portions 15 converge on a convergence line along the Y axis in a space containing the convergence point P. However, the description of the embodiment focuses on the convergence of light in the XZ plane to facilitate understanding of the embodiment and describes the same as light from the light focusing portions 15 converging on the convergence points P.

Figure 2:
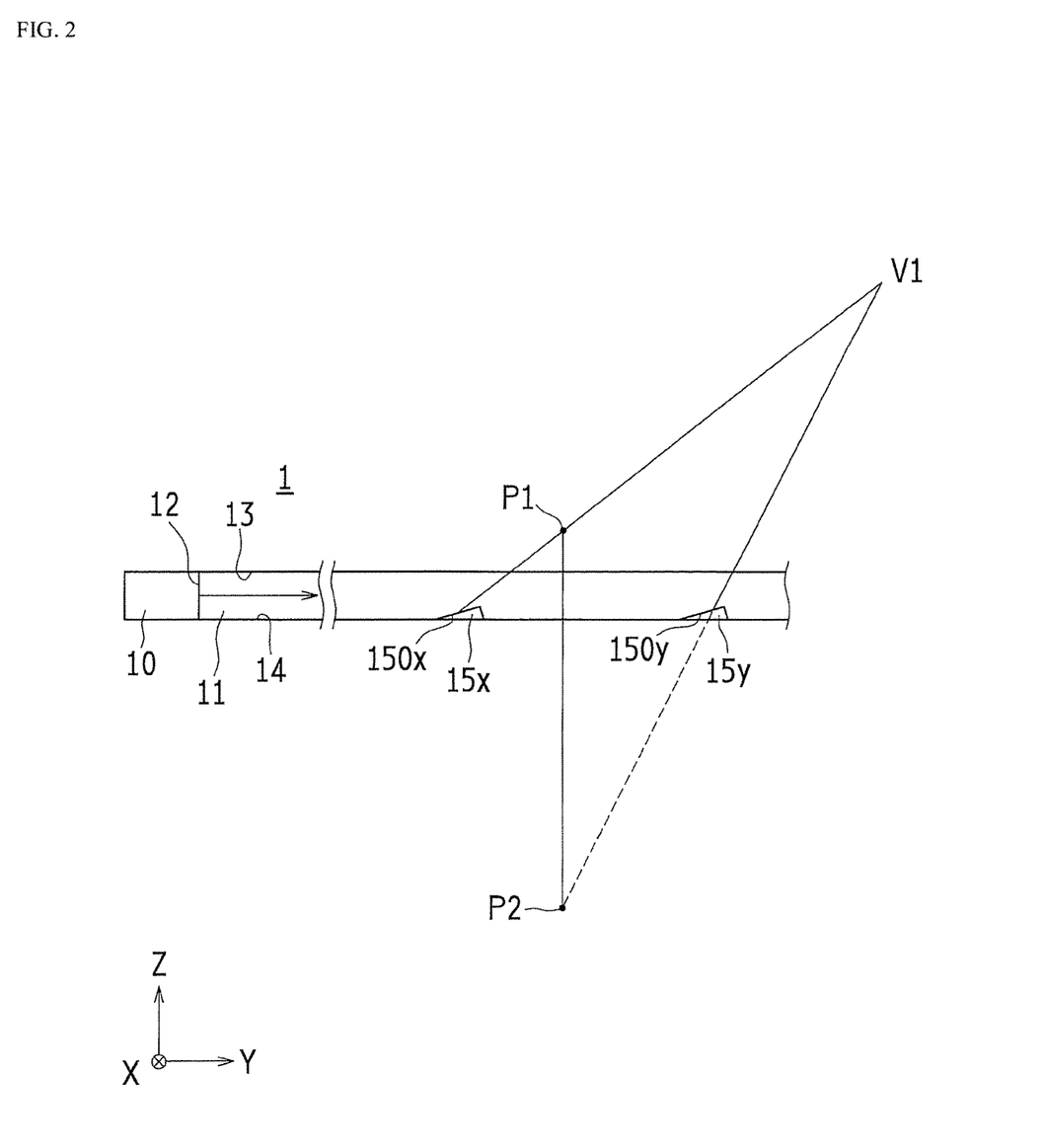
FIG. 2 is a conceptual diagram outlining a cross section of the display device according to embodiments of the present invention and an optical path.
Figure 3:
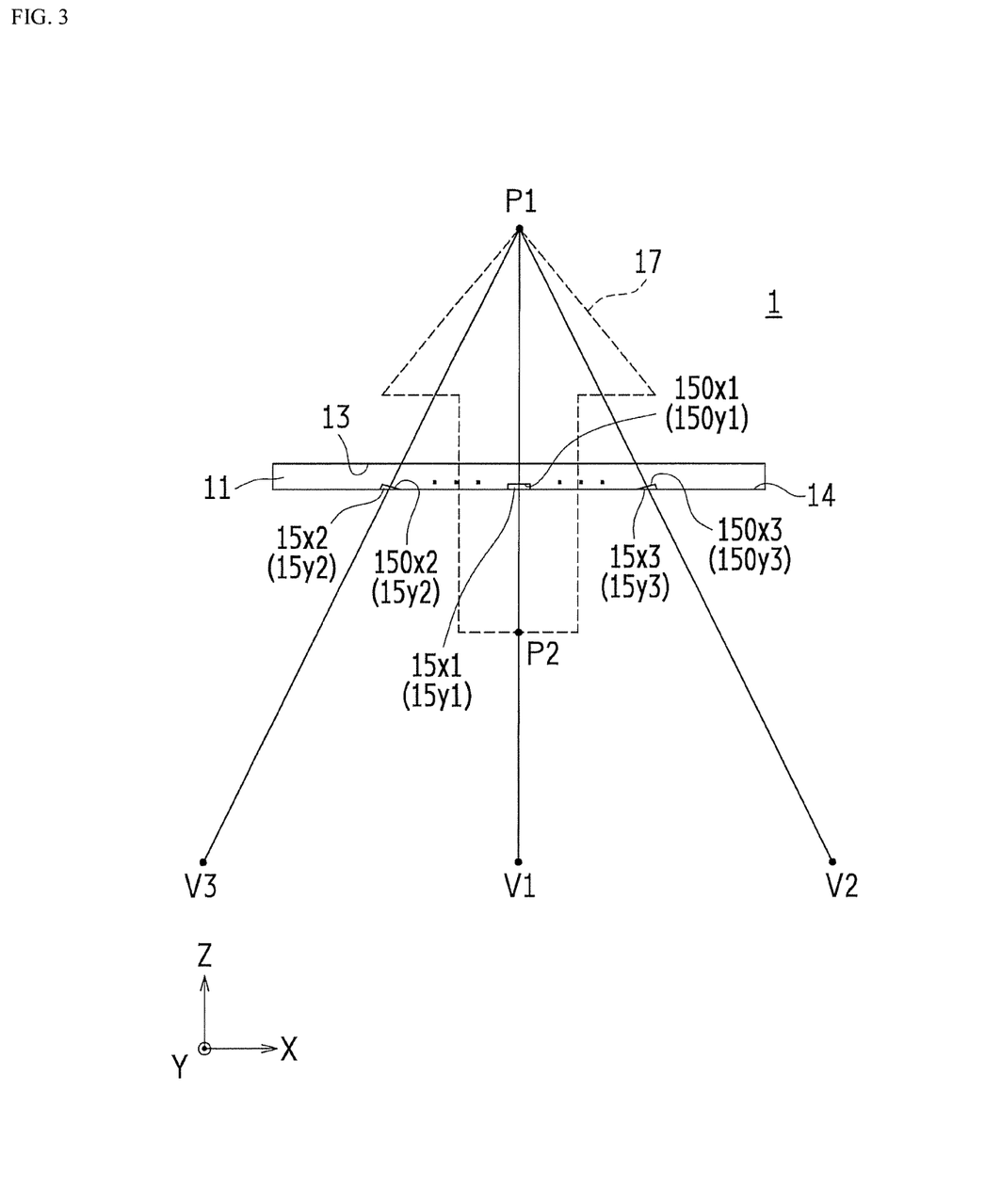
FIG. 3 is a conceptual diagram outlining a cross section of the display device according to embodiments of the present invention and an optical path.

FIGS. 2 and 3 are conceptual diagrams outlining a cross section of the display device according to embodiments of the present invention and an optical path; FIG. 2 illustrates a cross-section parallel to the YZ plane, and FIG. 3 also illustrates the image 17 viewed by an observer of a cross-section parallel to the XZ plane. FIG. 2 and FIG. 3 illustrates not only the emission surface 13 of the light guide plate 11 (i.e., the positive Z axis direction), but also provides an example of the image 17 representing an arrow that also spreads at the rear surface 14 (negative Z axis direction). In the examples illustrated in FIG. 2 and FIG. 3, the image 17, which represents an arrow, appears with the front portion of the arrow protruding from the emission surface 13 and the rear portion of the arrow protruding from the rear surface 14.

As illustrated in FIG. 2, the light source 10 is installed at the incidence end surface 12 of the light guide plate 11, and the incidence end surface 12 and the emission surface 13 are substantially orthogonal. Additionally, the rear surface 14 faces the emission surface 13, and the rear surface 14 is also substantially orthogonal to the incidence end surface 12. The rear surface 14 is a flat surface substantially parallel to the emission surface 13 and is provided with inclined surfaces that form the reflection surfaces 150 (150x, 150y) of the light focusing portions 15. The flat rear surface 14 along with the emission surface 13 directs the incident light entering the light guide plate 12 from the incidence end surface 11 via total internal reflection therebetween and function to spread the light in the light guide plate 11 in planar form. The inclined reflection surfaces 150 of the light focusing portions 15 reflect the incident light entering the light guide plate 11 to thereby adjust the optical path of the light toward the emission surface 13.

That is, the light emitted from the light source 10 and entering the light guide plate 11 from the incidence and surface 12 is repeatedly totally reflected between the emission surface 13 and the rear surface 14 within the light guide plate 11 and propagates therethrough in planar form. On arriving at a reflection surface 150 formed in the light focusing portion 15, the light propagating through the light guide plate 11 is reflected by the reflection surface 150 and exits to the outside from the emission surface 13.

As illustrated in FIG. 2 and FIG. 3, the plurality of light focusing portions 15x (light focusing portions 15x1, 15x2, 15x3, . . . ) located on a line 16 include reflection surfaces 150x1, 150x2, 150x3, . . . , respectively. The reflection surfaces 150x1, 150x2, 150x3, . . . corresponding to the plurality of light focusing portions 15x located along the line 16 reflect light toward the emission surface 13 in a direction converging at a convergence point P1 near the emission surface 13. A plurality of light focusing portions 15y (light focusing portions 15y1, 15y2, 15y3, . . . ) is located on another line 16 and also include reflection surfaces 150y1, 150y2, 150y3, . . . , respectively. The reflection surfaces 150y1, 150y2, 150y3 corresponding to the plurality of light focusing portions 15*y* located along the other line 16 reflect light toward the emission surface 13 toward a direction where the light radiates from a convergence point P2 near the rear surface 14. Therefore, the incline of the reflection surface 150*y*2 of the light focusing portion 15*y*2 and the reflection surface 150*y*3 of the light focusing portion 15*y*3 (written in parenthesis in FIG. 3) are the opposite direction in FIG. 3 and are inclined toward the end surface of the light guide plate 11.

The reflection surfaces 150*x* (e.g., the reflection surfaces 150*x*1, 150*x*2, 150*x*3, . . . ) each reflects light from the light source 10 in a direction along a line connecting a point on each of the reflection surfaces 150*x* and the convergence point P1. The light rays reflected from the reflection surfaces 150*x* converge at the convergence point P1. Thus, the plurality of reflection surfaces 150*x* in corresponding light focusing portions 15*x* reflects incident light entering from the light source 10 in a direction along a line connecting a point on each of the reflection surfaces 150*x* and the convergence point P1. Therefore, the display device 1 can supply light from the convergence point P1 oriented toward any of the positions in a range from a position V2 through a position V1 and up to position V3. A convergence point P1 of this kind produces the image 17 which appears to protrude from near the emission surface 13.

The reflection surfaces 150*y* (e.g., the reflection surfaces 150*y*1, 150*y*2, 150*y*3, . . . ) each reflects incident light entering from the light source 10 in a direction along a line connecting a point on each of the reflection surfaces 150*y* and the convergence point P2. The light rays reflected from the reflection surfaces 150*y* may be extended in a direction opposite the direction the light rays travel, in which case the extension line from the light rays converge at the convergence point P2. Thus, the plurality of reflection surfaces 150*y* in corresponding light focusing portions 15*y* reflects incident light entering from the light source 10 in a direction along a line connecting a point on each of the reflection surfaces 150*y* and the convergence point P2. Therefore, the display device 1 can supply light from the convergence point P2 oriented toward any of the positions in a range from a position V2 through a position V1 and up to position V3. A convergence point P2 of this kind produces the image 17 which appears to protrude from the opposite side of emission surface 13 (i.e., near the rear surface 14).

As above described, the light guide plate 11 includes a plurality of light focusing portions 15 having mutually different convergence points P, where a grouping of a plurality of convergence point P including a convergence point P1 and a convergence point P2 produces an image 17 that serves as a stereoscopic image. That is, the light guide plate 11 is provided with a plurality of light focusing portions 15 which change the path of incidence light toward an emission surface 13 causing the light output to converge toward an external convergence point or convergence line or to radiate from an external convergence point or convergence line and thereby form an image externally. By grouping a plurality of convergence points P and convergence lines, the display device 1 can thus form an image 17 outside the light guide plate 11 that can be perceived by an observer as a stereoscopic image.

In other words, the following kinds of statements can be made. Light emitted from a light source 10 enters a light guide plate 11, and the light guide plate 11 guides light within a plane parallel to the emission surface 13. A plurality of light focusing portions 15 is formed on the light guide plate 11; the light focusing portions 15 lengthen in a direction (i.e., the X axis direction) orthogonal to the direction (Y axis direction) in which the light guide plate guides light within a plane parallel to the emission surface 13. Each of the light focusing portions 15 includes optical surfaces where the direction of the normal line thereof projected onto a surface parallel to the emission surface varies continuously or gradually along the length direction (X axis direction) of the light focusing portions 15. The light guided by the light guide plate 11 reflects from the optical surfaces whereby the light exits as emission light from the emission surface 13 in a direction to substantially converge on a single convergence point P or convergence line in a space, or to substantially radiate from a single convergence point P or convergence line. The convergence points P or convergence lines are mutually different for the plurality of light focusing portions 15 at different positions along the Y axis, and grouping a plurality of convergence points P or convergence lines produces an image 17 in a space.

FIG. 2 and FIG. 3 and the corresponding descriptions illustrate a stereoscopic image that appears to protrude from both the emission surface 13 and the rear surface 14; this is used to describe the basic principles behind producing a stereoscopic image. However, as illustrated in FIG. 1 the stereoscopic image may appear to protrude from near only one surface.

The reflection surfaces 150 here serve as the light focusing portions 15. However, the light focusing portions 15 can have various forms so long as the light focusing portions 15 can change the path of incident light traveling through the light guide plate 11. For instance, the light focusing portion 16 may be formed as a cylindrical Fresnel lens, whereby the refraction effect of the refraction surface of the Fresnel lens (i.e. the prism surface) changes the path of the incident light. Additionally, in this case the Fresnel lens may be constituted by a plurality of parts with gaps therebetween. The light focusing portions 15 may also be formed as a diffraction grating whereby the diffraction effect may change the path of the incident light. Moreover, the reflection effect and the refraction effect of the prism may change the optical path of the incident light.

Additionally, the distances between all the convergence points P and emission surface 13 may be non-uniform. In this case, the density of converging light is configured to increase as the distance from the emission surface 13 increases when forming an image 17 that spreads for instance three dimensionally, or when forming a two-dimensional image 17 that contains a plane obliquely intersecting the emission surface 13. Hereby, any blurring in the image 17 formed is substantially uniform, making it possible to create an image 17 that does not make the observer uneasy.

Furthermore, while the light emitted from the light source 10 is represented as incident light entering the light guide plate 11 from the incidence end surface 12, which is one in surface in the longitudinal direction of the light guide plate 11, the incident light is not limited thereto. For example, the rear surface 14 may be taken as the light incidence surface and appropriately designed so that light enters the light guide plate therefrom.

First Embodiment

Figure 4:
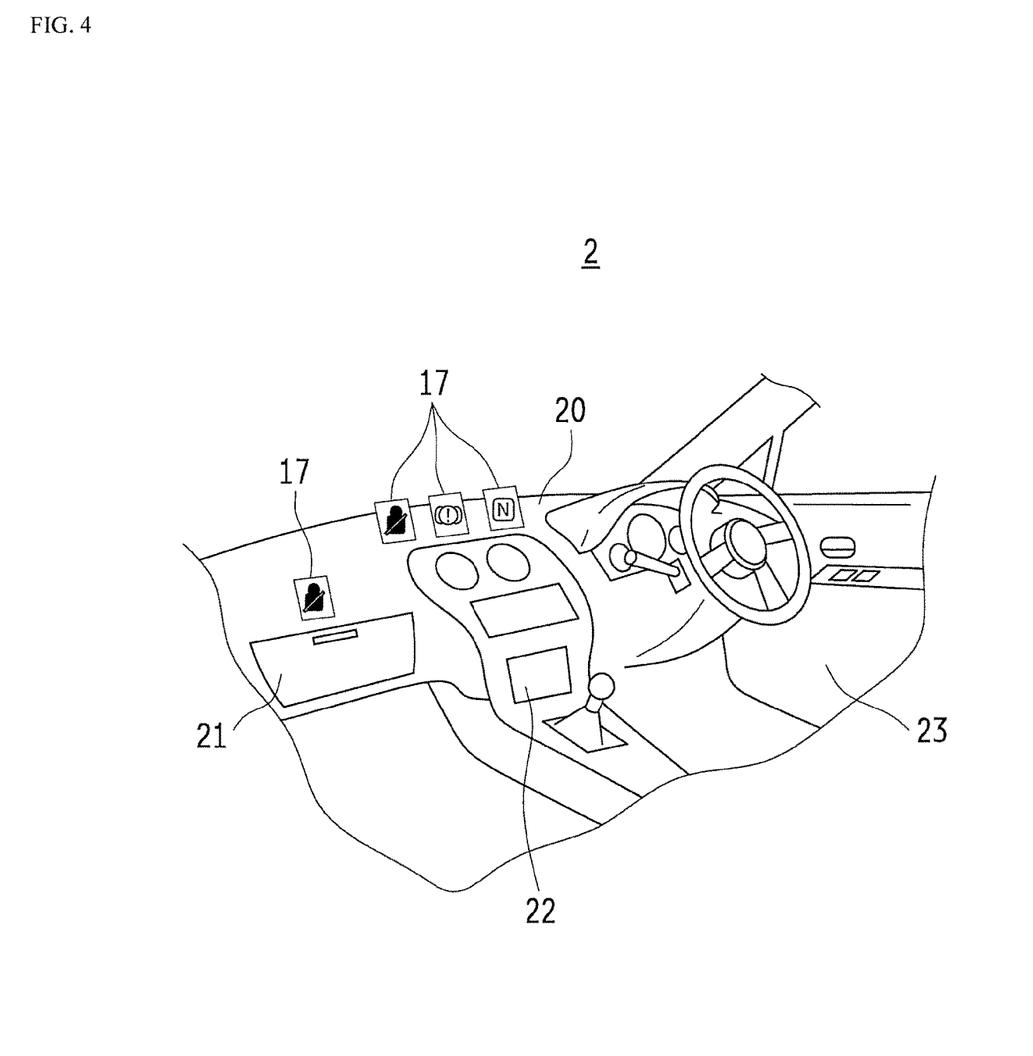
FIG. 4 is a schematic view illustrating around the driver seat in a vehicle provided with a display device according to the first embodiment of the present invention mounted therein as an internal component.

A display device 1 thusly configured according embodiments of the present invention may be installed as an internal vehicle component; such an embodiment is described below. FIG. 4 is a schematic view illustrating around the driver seat in a vehicle 2 provided with a display device according to the first embodiment of the present invention mounted therein as an internal component. The vehicle 2 in FIG. 4 is a passenger vehicle. A display device 1 according to embodiments of the present invention is mounted in the vehicle 2 and the image 17 produced by the display device 1 is projected above a dashboard 20 provided in front of both the driver seat and the passenger seat. The projected image 17 presents various content such as the status of the vehicle 2, the status of the ridership, and the operation state of the vehicle 2. The projected image 17 presents a still image particularly for display states that are fixed. FIG. 4 depicts images representing: the vehicle state, i.e., a brake warning indicator; a ridership state, i.e., an unbuckled seatbelt indicator showing whether the passenger seat or driver seat seatbelt is unbuckled, and the vehicle operation state, i.e., a gear position indicator (shown as "N", FIG. 4). These kinds of images 17 are not limited to the images illustrated in FIG. 4 and may further include images representing, for instance, a water temperature indicator, a headlamp beam direction indicator, a fog light indicator, a four-wheel drive indicator, an engine warning indicator, an oil pressure warning indicator, a battery warning indicator, a fuel level warning indicator, an ABS warning indicator, an SRS warning indicator, and direction indicators. The gear shift position indicator is not limited to the "N" as depicted in FIG. 4 but may also include images of other gear positions "P", "R", "D", "2", "L", and the like, or may further include an image indicating the state of an overhead light. In FIG. 4, the image 17 is presented enclosed in a thin square frame to provide a convenient illustration. The image 17 may in fact be shown as floating inside a square frame over a space including a rectangle represented by the square frame.

Figure 5:
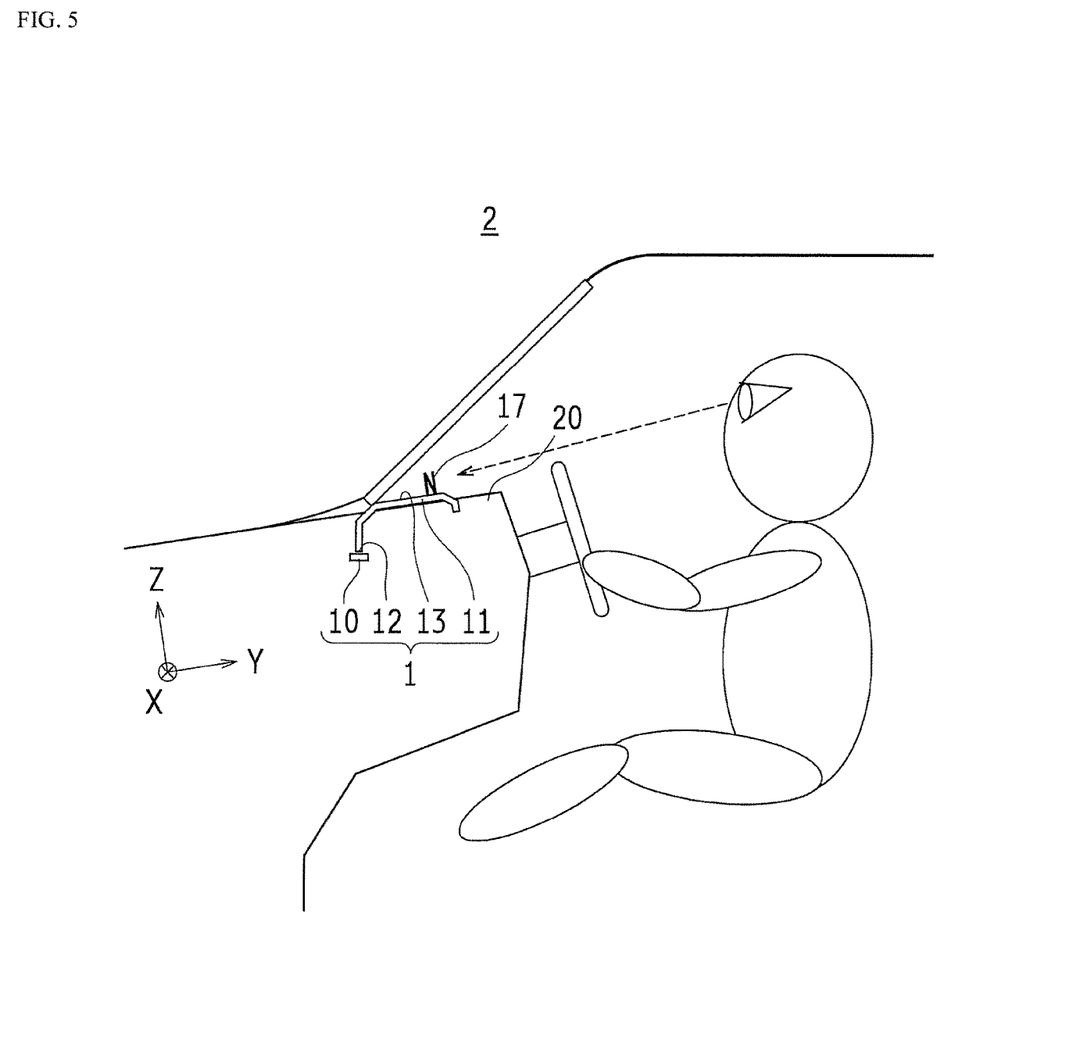
FIG. 5 is a schematic cross-sectional view illustrating around the drivers seat and includes a driver in a vehicle provided with a display device according to the first embodiment of the present invention mounted therein as an internal component.

FIG. 5 is a schematic cross-sectional view illustrating around the drivers seat and includes a driver in a vehicle provided with a display device according to the first embodiment of the present invention mounted therein as an internal component; FIG. 5 schematically illustrates a cross section parallel to the YZ plane. The display device 1 is arranged on the upper part of the dashboard 20 in the vehicle 2 so that the emission surface 13 in the light guide plate 11 is oriented upward. The light guide plate 11 in the display device 1 may be configured from a flexible transparent panel; the incidence end surface 12 at the end portion of the light guide plate 11 near the light source 10 or the opposite end may be bent and embedded in the dashboard 20. The light focusing portions 15 are formed in the flat middle section of the light guide plate 11; this flat middle section serves as the emission surface 13, and the emission surface 13 is oriented upward. The light source 10 is embedded in the dashboard 20 with the incidence end surface 12 attached thereto; the light source 10 is connected to a control device (not shown) in the vehicle 2 and emits light as appropriate on the basis of control from the control device.

Figures 6A, 6B:
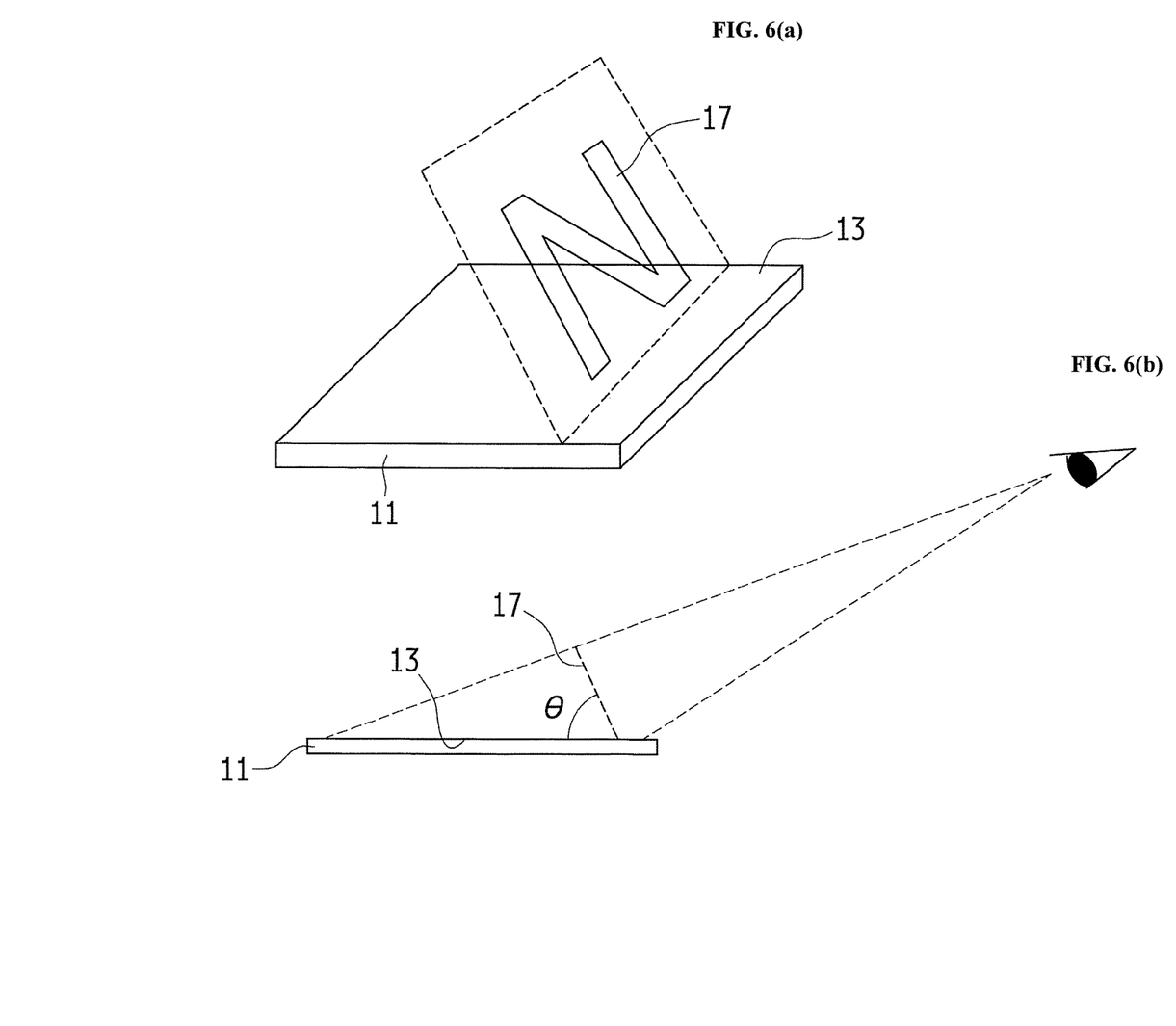
FIG. 6A and FIG. 6B are schematic diagrams for describing the relationship between an emission surface of the display device according to the first embodiment of the present invention and an image.

The light focusing portions 15 in the light guide plate 11 are configured to form images only upward. That is the light focusing portions 15 form an image above the dashboard 20 where it is embedded so that various planar images such as an image representing the position of the gearshift is formed along a virtual plane oblique or orthogonal to the emission surface 13. FIG. 6A and FIG. 6B are schematic diagrams for describing the relationship between an emission surface of the display device according to the first embodiment of the present invention and an image. FIG. 6A is a schematic view illustrating the relationship between the emission surface 13 of the light guide plate 11 in the display device 1 and the image 17 that is formed; FIG. 6B is a schematic side view. In FIG. 6A and FIG. 6B, the virtual plane created by the emission surface 13 and the image 17 slants at an angle θ. The image 17 is formed in a flat plane substantially orthogonal to the direction of an observer, i.e., the driver's gaze, and the image 17 is readily visible to the driver. Note that depending on the positioning of the light guide plate 11, the image 17 may be formed such that the angle θ is a right angle; that is the light guide plate 11 may be positioned so that the emission surface and the virtual plane are orthogonal. In addition, not all the images 17 need to be formed oriented toward the driver. For instance, the image of an unbuckled passenger seatbelt indicator may be formed in a plane substantially orthogonal to the direction of the observer's gaze, i.e. in the direction of a rider in the passenger seat.

The installation location of the display device 1 in general, and of the light guide plate 11 in particular is not limited to the dashboard 20 as above described. As illustrated in FIG. 4, the display device 1 may be arranged at various locations such as the cover of the glove box 21 in front of the drivers the passenger seat or thereabouts, the center console 22 between the drivers seat and the passenger seat, an armrest (not shown), and any site on the door trim 23 that is an internal door component. Riders in any seat such as the driver seat, the passenger seat, or the backseat can view an image 17 produced by the display device 1.

A display device 1 thusly configured does not require warning lights to be arranged in the panel; therefore, this increases the flexibility in designing the panel, and in order to improve visibility of the warning lights displays allows images 17 of the appropriate size to be produced. Additionally, light guide plates 11 may be stacked for images that do not need to be displayed simultaneously, e.g., images showing the position of the gearshift to allow each gear position to be shown by switching the display at the same position. It is thus possible to minimize the space needed for display.

Second Embodiment

Figure 7:
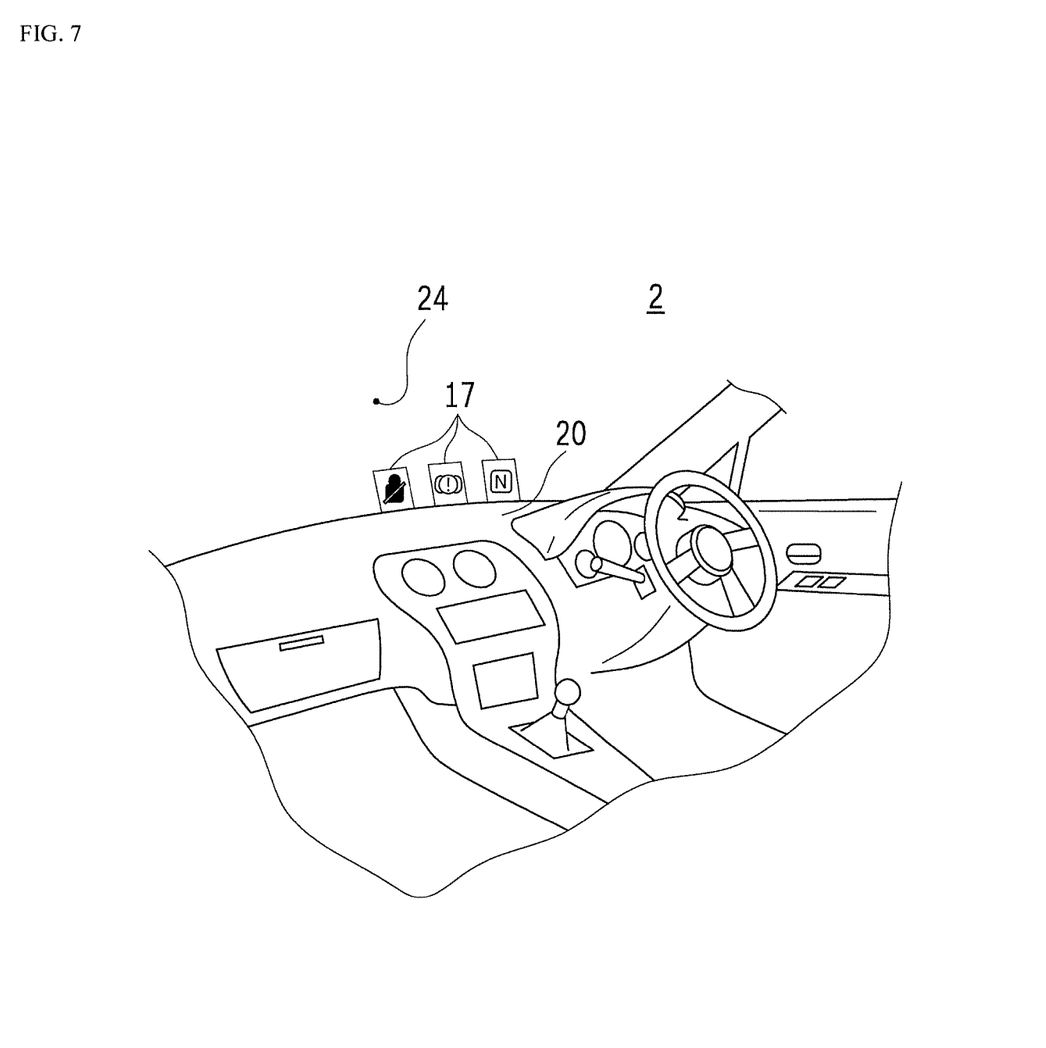
FIG. 7 is a schematic view illustrating near the drivers seat in a vehicle cabin provided with a display device according to a second embodiment of the present invention mounted therein as an internal component.

FIG. 7 is a schematic view illustrating near the drivers seat in a vehicle cabin provided with a display device according to a second embodiment of the present invention mounted therein as an internal component. In the second embodiment, the image 17 created by the display device 1 is projected in front of the driver seat near the lower part of the front windshield 24 above the dashboard 20. The formed image 17 is identical to the image describes for the first embodiment using FIG. 4; it is thus sufficient to reference the first embodiment for these configurations and so further descriptions thereof are omitted. In FIG. 7, the image 17 is presented enclosed in a thin square frame to provide a convenient illustration. The image 17 may in fact be shown inside a square frame presented in a space including a rectangle represented by the square frame.

Figure 8:
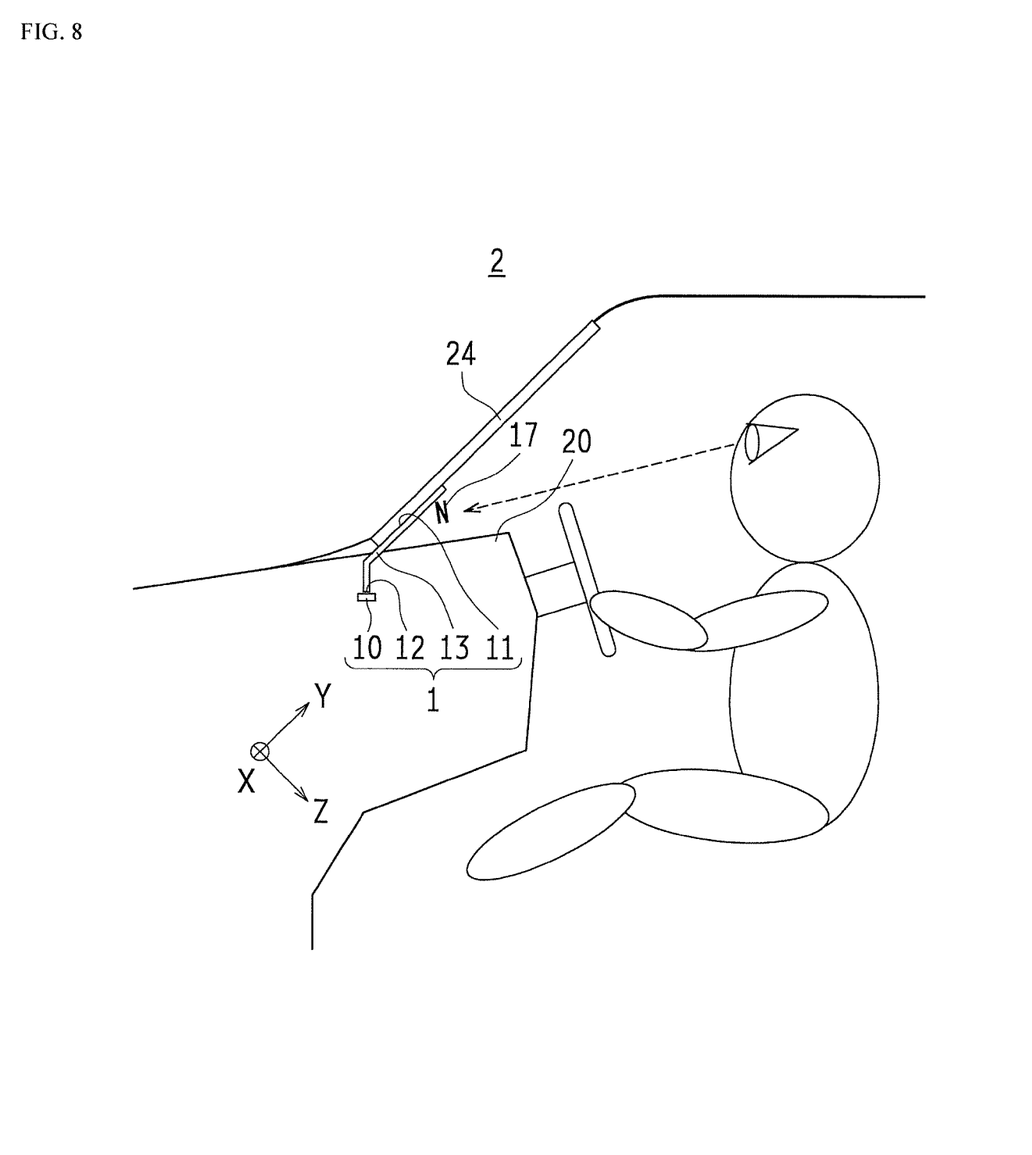
FIG. 8 is a schematic cross-sectional view illustrating around the driver seat and includes a driver in a vehicle provided with a display device according to the second embodiment of the present invention mounted therein as an internal component.

FIG. 8 is a schematic cross-sectional view illustrating around the driver seat and includes a driver in a vehicle provided with a display device according to the second embodiment of the present invention mounted therein as an internal component. FIG. 8 schematically illustrates a cross section parallel to the YZ plane. The display device 1 is arranged on the lower part of the front windshield 24 in the vehicle 2 so that the emission surface 13 in the light guide plate 11 is oriented downward. The light guide plate 11 in the display device 1 may be configured from a flexible transparent panel; the incidence end surface 12 at the end portion of the light guide plate 11 near the light source 10 may be bent and embedded in the dashboard 20. The light focusing portions 15 are formed in a flat section of the light guide plate 11; this flat section serves as the emission surface 13, and the emission surface 13 is oriented downward. The light source 10 is embedded in the dashboard 20 with the incidence end surface 12 attached thereto; the light source 10 is connected to a control device (not shown) in the vehicle 2 and emits light as appropriate on the basis of control from the control device.

The light focusing portions 15 in the light guide plate 11 are configured to form images only inside the vehicle. That is the light focusing portions 15 form an image near the lower part of the front windshield 24 (above the dashboard 20) so that various planar images such as an image representing the position of the gearshift is formed along a virtual plane oblique or orthogonal to the emission surface 13. The image 17 is formed in a flat plane substantially orthogonal to the direction of an observer, i.e., the driver's gaze, and the image 17 is readily visible to the driver. Not all the images 17 need to be formed oriented toward the driver. For instance, the image of an unbuckled passenger seatbelt indicator may be formed in a plane substantially orthogonal to the direction of the observer's gaze, i.e. in the direction of a rider in the passenger seat. Additionally, not all images 17 need to be produced inside the vehicle; all or a portion of the images may be formed outside the vehicle so long as visibility is not a problem.

A display device 1 thusly configured exhibits superior benefits, such as increasing the flexibility in designing internal components for the vehicle 2 while providing the driver with important information.

Third Embodiment

Figure 9:
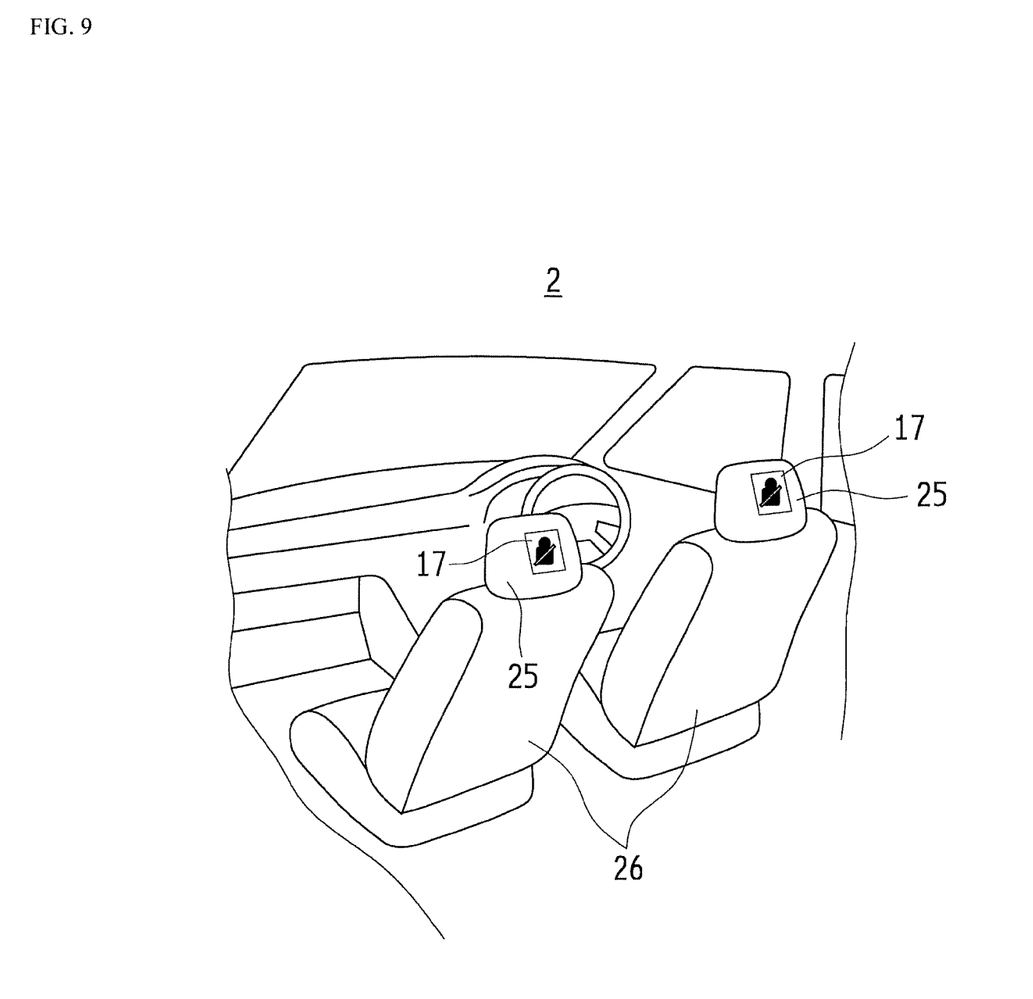
FIG. 9 is a schematic view illustrating near the rear passenger seat in a vehicle cabin provided with a display device according to a third embodiment of the present invention mounted therein as an internal component.

FIG. 9 is a schematic view illustrating near the rear passenger seat in a vehicle cabin provided with a display device according to a third embodiment of the present invention mounted therein as an internal component. In the third embodiment, the image 17 produced by the display device 1 is projected behind the head rest 25 of a front seat. The image 17 may be an unbuckled seat indicator for the backseat. For instance, the display device 1 may be installed at the rear part of the front seat head rest 25, the lower part of the seatback of the front seat 26, or the cabin ceiling whereby and image 17 is projected as depicted in FIG. 9. The display device 1 may also be arranged at various locations such as the container trip (not shown) behind the back seat, or the door trim (not shown), which is an internal component of the rear door. The display device may be configured so that if an image 17 is produced for the rear part of the vehicle 2, then the image formed should be visible to riders in the back seat; and for example, the display device may be configured so that a driver seated in the driver seat can verify the image without looking toward the back. More specifically, when the gearshift is placed in reverse (i.e., "R"), a display device 1 in the container trim may show an image 17 for various indicators whereby various displays are presented, e.g., to represent the state of the vehicle 2 allowing the driver to recognize various kinds of information.

The present invention is not limited to the above described embodiments and may be implemented in various other ways. Therefore, in all respects the above embodiments are merely examples and should not be interpreted as limitations. The scope of the present invention is delineated by the claims and not limited by the specification. Moreover, all modifications and variations with a scope equivalent to the claims are within the scope of the present invention.

For example, the aforementioned embodiments illustrated producing images in a two-dimensional plane; however, the present invention is not limited thereto and may be developed into various forms where a three-dimensional image is produced. The aforementioned embodiments also illustrated arranging the display device on the surface of the front windshield 24; however, the present invention is not limited thereto, and may be configured such that the display device is arranged on other window surfaces such as the rear windshield or a side window or the like.

Finally, the aforementioned embodiments depict a form that is mounted to a passenger vehicle. However, the display device may be mounted inside various other kinds of vehicles such as a train and may produce images inside the train. The display device may also be mounted inside other forms of conveyance besides a vehicle 2, such as in an airplane or on a ship, and produce images inside the conveyance.

REFERENCE NUMERALS

1 Display device
10 Light source
11 Light guide plate (light guide element)
12 Incidence end surface
13 Emission surface
15 (15a, 15b, . . . , 15x1, . . . , 15y3) Light focusing portions
17 Image
P (Pa, Pb, . . . , P1, P2) Convergence points
2 Vehicle
20 Dashboard
21 Glove box
22 Center console
23 Door trim
24 Front windshield
25 Head rest
26 Front seat

The invention claimed is:

1. A display device configured to show an image inside a vehicle, and mounted inside the vehicle as an internal component, the display device comprising:
a light source configured to emit light; and
a light guide element configured to guide incident light from the light source,
wherein the light guide element comprises:
an emission surface configured to output incident light, and
a plurality of light focusing portions configured to change a path of the incident light toward the emission surface, causing the light output to converge toward a convergence point or convergence line outside the light guide element to form the image or to radiate from a convergence point or convergence line outside the light guide element and thereby form the image outside the light guide element,
wherein distances between all convergence points and the emission surface are non-uniform.

2. The display device according to claim 1,
wherein the light focusing portions are configured to form an image on a virtual plane oblique or orthogonal to the emission surface.

3. The display device according to claim 1,
wherein the light guide element is arranged at the upper part of a dashboard with the emission surface oriented upward, and
wherein the light focusing portions are configured to form an image above the dashboard.

4. The display device according to claim 1,
wherein the light guide element is configured for arrangement on a window surface of the vehicle with the emission surface oriented toward inside the vehicle.

5. The display device according to claim 1,
wherein the light guide element is configured for arrangement on an internal component of the vehicle including at least one of a glove box, a center console, an arm rest, a door trim, a container trim, and a front seat.

6. The display device according to claim 1,
wherein the light focusing portions are configured to form an image for presentation of an image representing at least one of a vehicle state, a vehicle ridership state, and a vehicle operation state.

7. A display device mounted in a conveyance and configured to show an image inside the conveyance; the display device comprising:
- a light source configured to emit light; and
- a light guide element configured to guide incident light from the light source, wherein the light guide element comprises:
- an emission surface configured to output incident light, and
- a plurality of light focusing portions configured to change a path of the incident light toward the emission surface, causing the light output to converge toward a convergence point or convergence line outside the light guide element to form the image or to radiate from a convergence point or convergence line outside the light guide element and thereby form the image outside the light guide element, wherein distances between all convergence points and the emission surface are non-uniform.

8. The display device according to claim 2,
wherein the light guide element is arranged at the upper part of a dashboard with the emission surface oriented upward, and
wherein the light focusing portions are configured to form an image above the dashboard.

9. The display device according to claim 2,
wherein the light guide element is configured for arrangement on a window surface of the vehicle with the emission surface oriented toward inside the vehicle.

10. The display device according to claim 2,
wherein the light guide element is configured for arrangement on an internal component of the vehicle including at least one of a glove box, a center console, an arm rest, a door trim, a container trim, and a front seat.

* * * * *